United States Patent Office 2,779,790
Patented Jan. 29, 1957

2,779,790

(p-ACETOCYCLOHEXANYL) (p-CYCLOHEXEN-ONYL) DIETHYL ETHANE COMPOUNDS

Erich M. H. Radde, New York, N. Y.

No Drawing. Application November 20, 1953,
Serial No. 393,501

Claims priority, application Germany December 2, 1949

1 Claim. (Cl. 260—586)

This invention relates to dicyclohexyl ethane compounds, and more particularly to dicyclohexyl ethane compounds substituted by alkyl residues, and a method of producing same.

The present invention is a continuation-in-part application of my co-pending application Serial No. 193,275, filed October 31, 1950, relating to "Dicyclohexyl Ethane Compounds and a Method of Making Same," now Patent No. 2,661,369. Said co-pending application refers to (p-cyclohexenonyl)-(p-hydroxy aceto cyclohexanyl)-diethyl ethane compounds of the following formula

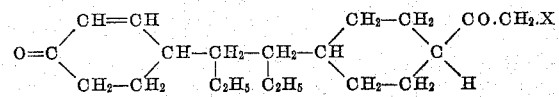

wherein X represents a member selected from the group consisting of a hydroxyl group and an acyloxy group.

It is one object of this invention to provide new chemical compounds of the following formula

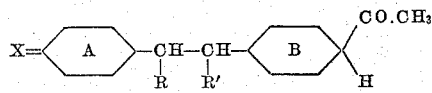

wherein R and R' are alkyl radicals, especially ethyl radicals, while X represents a keto or a secondary alcohol group or a group convertible by hydrolysis into said keto or secondary alcohol group. The cyclohexyl nuclei A and B may be saturated but they may also contain a double bond.

A further object of this invention is to provide methods for producing said compounds by using compounds of the following formula as starting materials:

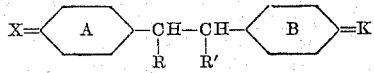

wherein X, R, and R' indicate the same groups as stated above and K is a keto group, while rings A and/or B may contain double bonds. Such starting materials are described, for instance, in French Patent 872,058 which relates to hydroxy ketones or diketones respectively of dicyclohexanedialkyl ethane compounds which are derived from the corresponding dialkyl stilbestrol compounds.

Other objects of this invention will be apparent from the specification and the claim attached thereto.

Compounds having the activity of the corpus luteum hormone are obtained for instance by converting a (p-acyloxy cyclohexanyl)(p-cyclohexanonyl)diethyl ethane, as they can be produced according to Example 8 or 10 of French Patent 872,058 into the corresponding cyanohydrin, splitting off water from the tertiary hydroxyl group and the neighbouring methylene group in said cyanohydrin, reacting the dehydronitrile with Grignard reagent so as to form the aceto cyclohexene compound, hydrogenating the double bond, oxidizing the hydroxyl group to the keto group, introducing bromine into the ketonic cyclohexane ring of the compound, and splitting off hydrogen bromide from said bromo compound. The resulting (cyclohexenonyl) (p-acetocyclohexanyl) diethyl ethane has the activity of the corpus luteum hormone.

The reaction described may be illustrated by the following formulas, wherein A and B represent saturated cyclohexane rings of the following structure

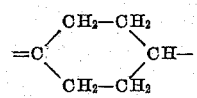

while A' and B' represent unsaturated cyclohexane rings of the following structures

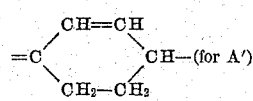

and

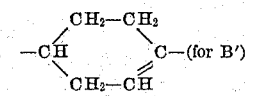

respectively:

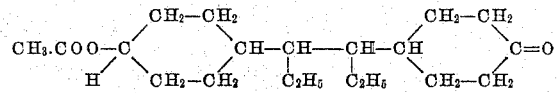

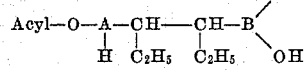

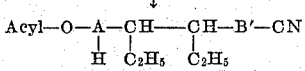

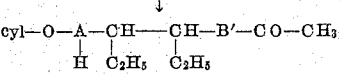

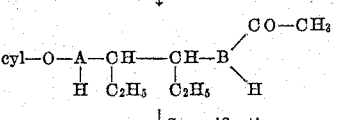

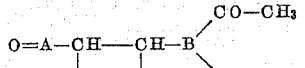

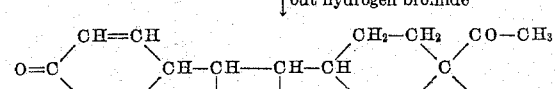

As can be seen from the foregoing, the present invention consists in principle in subjecting the starting material which has one free keto group to reactions as they are known to the art and especially in steroid hormone chemistry, whereby side chains are introduced into the molecule, said side chains corresponding in structure to the side chains present in said steroid hormones.

The following example serves to illustrate the invention, without, however, limiting the same thereto.

*Example*

20 g. of (p-acetoxycyclohexanyl)(p-cyclohexanonyl) diethyl ethane obtained according to French Patent No. 872,058, Example 8 or 10, are dissolved in 250 cc. of 96% ethyl alcohol. 40 g. of potassium cyanide and thereafter 50 g. of glacial acetic acid are added to said alcoholic solution while stirring. The reaction mixture is heated to boiling under reflux and is kept boiling for 2 hours, thereby stirring continuously. The solution is cooled to room temperature and is then poured into 500 cc. of chloroform. After addition of 1000 cc. of water the mixture is stirred and the chloroform extract separated from the aqueous solution. The latter is again extracted in the same manner twice with 200 cc. of chloroform and once with 150 cc. of chloroform. The chloroform extract is washed with water, 3% hydrochloric acid, and again acid-free with water and the chloroform is then distilled off in a vacuum. The cyanohydrin obtained may be further purified but it can be used as such for the next step.

44 g. of crude cyanohydrine are dissolved in 350 cc. of pure pyridine at room temperature. 35 cc. of pure phosphorus oxychloride are added to said solution and the reaction mixture is heated to boiling under reflux for about 4 hours. It is then cooled to room temperature, and poured upon a mixture of 1000 cc. of water containing about 400 g. of ice and 400 cc. of conc. hydrochloric acid while stirring vigorously. The dehydronitril precipitated is then dissolved in about 1000 cc. of acetone while stirring and heating under reflux. After filtering, the acetone is partly distilled off and then cooled until the dehydronitril precipitates. The precipitate may be purified by redissolving and recrystallisation from aqueous acetone.

Methylbromide is passed into 250 cc. of dry ether with 24 g. magnesium chips to which a few iodine crystals have been given. As soon as the absorption of methylbromide stops, i. e. as soon as about 125 g. of methylbromide are consumed and all the magnesium has reacted, a solution of 20 g. of dehydronitril in 200 cc. of anisol is run into said Grignard reagent solution. The reaction mixture is then heated for about 4–5 hours to about 60° C. while stirring, and is cooled to room temperature. It is thereafter added drop by drop, while stirring and cooling, to 1000 cc. of 50% acetic acid and then heated to remove part of the ether and anisol. The remainder is distilled off by steam distillation until all the anisol is removed. 400 cc. of hydrochloric acid 1:1 are then added and the acidified mixture is extracted several times with 200 cc. of chloroform each time. The combined chloroform extracts are washed with hydrochloric acid 1:1, with water, with 3% sodium hydroxide and again with water. The washed neutral chloroform extract is then evaporated to dryness. The dehydroacetohexahydrophenone obtained may be purified by recrystallisation from methanol.

13 g. of said dehydroacetohexahydrophenone are then hydrogenated in 650 cc. of methanol in the presence of 15 g. Raney nickel catalyst by passing hydrogen through said methanolic solution while shaking the reaction flask. As soon as the reduction of the double bond is completed, the methanol solution is separated from the catalyst which is washed with methanol and is kept under water until disposal. The methanol solution is then evaporated to dryness and the acetohexahydrophenone obtained recrystallized from acetone and if necessary purified over its semicarbazone. This is obtained by dissolving 10 g. of the crude product in 75 cc. of methanol while boiling under reflux. To the boiling solution there is added a solution of 6.5 g. of semicarbazide hydrochloride, and 10 g. of crystalline sodium acetate in 80 cc. of methanol and the boiling is continued for about 1 hour. After cooling the semicarbazone obtained is filtered off by suction and washed with methanol. The decomposition of said semicarbazone is carried out by heating the same in a mixture of 4 parts of methanol and 1 part of ether with 10 times its amount of 45% sulfuric acid for 1½ hours, pouring into water, filtering, and washing. The (p - hydroxycyclohexane)(p - acetocyclohexane)-diethyl ethane obtained may be further purified by recrystallisation from acetone.

50 g. of said acetocyclohexane compound are dissolved in 2000 cc. of dry toluene and are heated to boiling with 275 cc. of cyclohexanone. 22 g. aluminum isopropylate dissolved in about 100 cc. of toluene are then added thereto and the reaction mixture is kept boiling for about ½ hour. 125 cc. of water are added and the mixture is steam distilled in order to remove the toluene and the cyclohexanone and cyclohexanol. The aluminum hydroxide sludge is filtered off, washed with water and dried. It is then extracted, in a soxhlet apparatus, with acetic acid ethyl ester. The extract is evaporated to dryness and the diketone obtained is recrystallized from acetic acid ethyl ester.

10 g. of said diketone are dissolved in 300 cc. of chloroform. To said solution a solution of bromine in chloroform is added drop by drop while stirring and cooling between about −5° C. to −10° C. until 1 molecule of bromine has reacted to form the monobromo compound. The chloroform solution is washed with sodium bicarbonate solution and with water until it is neutral, is dried by means of sodium sulfate, and the chloroform is then distilled off by vacuum distillation.

The crude bromo compound is boiled under reflux with 75 cc. of dry pyridine for about 6 hours. The pyridine is removed by vacuum distillation and the residue dissolved in ether. The ethereal solution is washed with dilute sulfuric acid, with sodium bicarbonate solution, and with water, and is dried with sodium sulfate. The residue remaining after evaporation of the ether, is distilled in a high vacuum or is purified by chromatographic absorption over aluminum oxide and elution by means of petrol ether or benzene or any other suitable solvent. A (cyclohexenone)(acetocyclohexane) diethyl ethane is obtained which has the activity of the corpus luteum hormone and can be further purified by means of its semicarbazone.

Of course, many changes and variations may be made by those skilled in the art in the reaction conditions, the reagents used, the methods of purifying the reaction products, and the like, in accordance with the principles set forth herein and in the claim annexed hereto. Thus, for instance, instead of the acetyl compounds, esters with other acids such as propionic acid, benzoic acid, phosphoric acid, stearic acid and others, or ethers, such as the methyl ether and others may be used as starting or intermediate compounds or may be produced as final products. The oxidation of the secondary alcohol group to the keto group may be carried out with other oxidizing agents instead of chromic acid, such as with permanganate, by the Meerwein-Ponndorf reaction and the like. The double bond in conjugation to the keto group may be introduced by other known means; for instance, splitting out of hydrogen bromide may be effected by means of dimethyl aniline, quinoline, and others. The addition of hydrocyanic acid to the cyclohexanone compound may be carried out in any other known manner. Splitting out water between the tertiary alcohol group and a neighboring methylene group in a cyclohexanolyl ring which contains a further substituent on the carbon atom carrying the tertiary alcohol group, may be effected by other means, as acetylchloride in acetic acid anhydride and others. Other catalysts than those mentioned, may be employed for hydrogenating the double bond produced on splitting out water between said tertiary hydroxyl group and the neighboring methylene group, for instance, platinum catalysts, or said hydrogenation may be carried out by chemical means. The ketonic intermediate and end products may be purified not only by fractional crystallisation from suitable solvents, but also by converting them into insoluble ketonic condensation products, for instance, with thiosemicarbazide, phenylhydrazine and others, besides those mentioned in the examples. The keto compound may be reformed from said ketonic derivatives not only by hydrolysis by means of acids and the like, but also by reacting said derivatives with other aldehydes or ketones, such as benzaldehyde and others.

What I claim is:
(p - Cyclohexenonyl)(p - aceto cyclohexanyl)diethyl ethane of the following formula

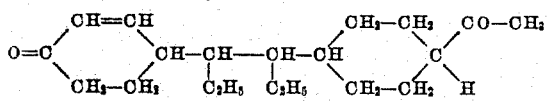

References Cited in the file of this patent
UNITED STATES PATENTS

| | | |
|---|---|---|
| 2,351,637 | Ruzicka et al. | June 20, 1944 |
| 2,392,864 | Schoeller et al. | Jan. 15, 1946 |